(12) United States Patent
Chen et al.

(10) Patent No.: US 7,538,851 B2
(45) Date of Patent: May 26, 2009

(54) LIQUID CRYSTAL DISPLAY DEVICE AND METHOD FOR MANUFACTURING A SUBSTRATE FOR USE IN AN LCD DEVICE

(75) Inventors: Yung-Chang Chen, Miao-Li (TW); Jia-Pang Pang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 429 days.

(21) Appl. No.: 11/305,966

(22) Filed: Dec. 19, 2005

(65) Prior Publication Data
US 2006/0132674 A1 Jun. 22, 2006

(30) Foreign Application Priority Data
Dec. 17, 2004 (TW) ............................... 93139383 A

(51) Int. Cl.
*G02F 1/1333* (2006.01)
*G02F 1/1335* (2006.01)
(52) U.S. Cl. ........................... 349/158; 349/61; 349/64
(58) Field of Classification Search ................ 349/158, 349/61, 64
See application file for complete search history.

(56) References Cited

U.S. PATENT DOCUMENTS

| | | | | |
|---|---|---|---|---|
| 6,222,689 B1 * | 4/2001 | Higuchi et al. | ............. | 359/837 |
| 6,359,668 B1 * | 3/2002 | Iijima et al. | ................... | 349/61 |
| 6,512,560 B2 * | 1/2003 | Ohtake et al. | ............... | 349/114 |
| 6,719,930 B2 * | 4/2004 | Chen et al. | .................... | 264/2.5 |
| 6,833,667 B2 * | 12/2004 | Hamano et al. | ............. | 313/504 |
| 2004/0105046 A1 * | 6/2004 | Taira et al. | .................... | 349/61 |
| 2006/0043362 A1 * | 3/2006 | Ishikawa et al. | ............. | 257/40 |

* cited by examiner

*Primary Examiner*—Mike Qi
(74) *Attorney, Agent, or Firm*—Wei Te Chung

(57) ABSTRACT

A liquid crystal display device (50) includes a first substrate (513), a second substrate (515) opposite to the first substrate having a prism structure (53) at an outer surface thereof, a liquid crystal layer having liquid crystal molecules interposed between the first and second substrates, and a backlight module opposite to the prism structure. The prism structure provides substantially the same function and performance as a prism sheet of a typical liquid crystal display. Thus the prism sheet can be omitted from the liquid crystal display device. The number of optical elements is reduced, and the liquid crystal display device has a lower cost and less weight.

10 Claims, 3 Drawing Sheets

LIQUID CRYSTAL DISPLAY DEVICE AND METHOD FOR MANUFACTURING A SUBSTRATE FOR USE IN AN LCD DEVICE

FIELD OF THE INVENTION

The present invention relates to liquid crystal display (LCD) devices, and more particularly to an LCD device having a substrate with a prism structure.

GENERAL BACKGROUND

With the widespread use of liquid crystal display devices, such as in high-end portable electronic devices, mobile phones, and PDAs (Personal Digital Assistants), the demand for greater quality and reduced weight of LCDs is ever present.

As shown in FIG. 8, a typical LCD device 10 includes a liquid crystal display panel 11 and a backlight module 12. The liquid crystal display panel 11 includes a first polarizer 111, a first substrate 112, a liquid crystal layer 113, a second substrate 114, and a second polarizer 115. The backlight module 12 includes a reflection sheet 122, a light guide plate 121, a diffusion sheet 124, and a prism sheet 125, in that sequence from bottom to top. A light source 123 is disposed adjacent to a side surface of the light guide plate 121. Light beams emitted by the light source 123 enter the light guide plate 121, and nearly all of the light beams pass through the diffusion sheet 124 and the prism sheet 125 to illuminate the liquid crystal display panel 11.

However, the inclusion of the prism sheet 125 in the above-mentioned conventional LCD device 10 greatly adds to the cost and weight of the LCD.

What is needed, therefore, is a liquid crystal display device that overcomes the above-described deficiencies.

SUMMARY

In a preferred embodiment, a liquid crystal display device includes a first substrate, a second substrate opposite to the first substrate having a prism structure at an outer surface thereof, a liquid crystal layer having liquid crystal molecules interposed between the first and second substrates, and a backlight module opposite to the prism structure.

In another preferred embodiment, a method for manufacturing a substrate of a liquid crystal display device includes: providing a substrate; adhibiting an anti-corrosion paper with a pattern on a surface of the substrate; and etching the surface to form a prism structure pattern.

The prism structure provides substantially the same function and performance as a prism sheet of a typical liquid crystal display. Thus the prism sheet can be omitted from the liquid crystal display device. The number of optical elements is reduced, and the liquid crystal display device has a lower cost and less weight.

Other advantages and novel features will become more apparent from the following detailed description when taken in conjunction with the accompanying drawings.

DETAILED DESCRIPTION OF PREFERRED EMBODIMENTS

Figure 1:
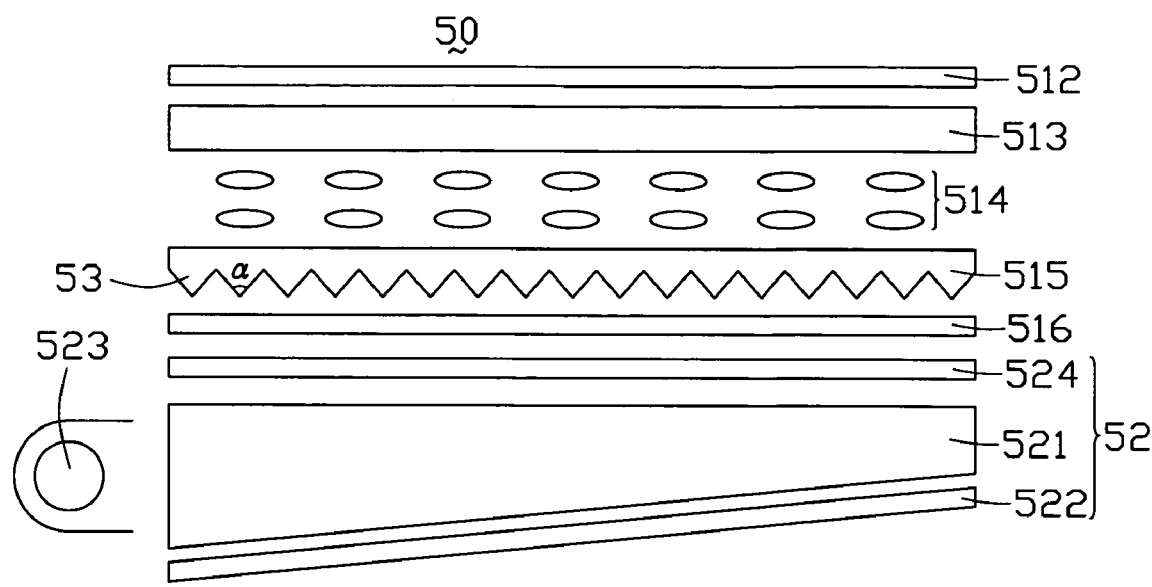
FIG. 1 is a schematic, exploded, side cross-sectional view of an LCD device according to a first embodiment of the present invention.

FIG. 1 is a schematic, side cross-sectional view of an LCD device 50 according to a first embodiment of the present invention. The LCD device 50 includes a first polarizer 512, a first substrate 513, a liquid crystal layer 514, a second substrate 515, and a second polarizer 516, and a backlight module 52 disposed in that sequence from top to bottom. The backlight module 52 includes a reflection sheet 522, a light guide plate 521, and a diffusion sheet 524, in that sequence from bottom to top. A light source 523 is disposed adjacent to a side surface of the light guide plate 521. A prism structure 53 is provided at an outer surface of the second substrate 515 opposite to the second polarizer 516. The prism structure 53 comprises a plurality of prisms, which define V-shaped grooves therebetween. Each of the prisms defines a bottom angle $\alpha$, which is in a range of 75° to 110°. In the preferred embodiment, the bottom angle $\alpha$ is 75°.

Light beams emitted by the light source 523 enter the light guide plate 521, and nearly all of the light beams pass through the diffusion sheet 524 and the second polarizer 516 to illuminate the second substrate 516. The plane light beams are enhanced by the prism structure 53 to display images. The prism structure 53 performs substantially the same function as a prism sheet of a typical liquid crystal display. Thus, the LCD device 50 need not contain a prism sheet, and can be lighter and thinner.

Figure 2:
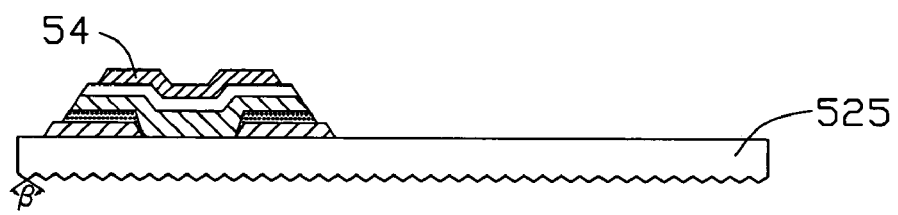
FIG. 2 is a schematic, side cross-sectional view of part of an LCD device according to a second embodiment of the present invention.

FIG. 2 is a schematic, side cross-sectional view of part of an LCD device according to a second embodiment of the present invention. A second substrate 525 is similar to the second substrate 515 of the LCD device 50 of the first embodiment. However, a bottom angle $\beta$ of each prism is 110°, and the LCD device further includes a thin-film-transistor array 54 disposed on an inner surface of the second substrate 525.

Figure 3:
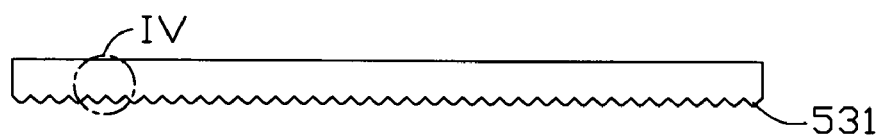
FIG. 3 is a schematic, side cross-sectional view of part of an LCD device according to a third embodiment of the present invention.
Figure 4:
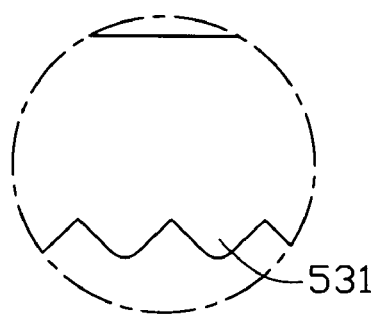
FIG. 4 is an enlarged view of a circled portion IV of FIG. 3.

FIG. 3 is a schematic, side cross-sectional view of part of an LCD device according to a third embodiment of the present invention. A second substrate 531 is similar to the second substrate 515 of the LCD device 50 of the first embodiment. However, as shown in FIG. 4, the bottom portion of each prism of the prism structure 531 is curved.

In each of the above-described embodiments of an LCD device, the prism structure performs substantially the same function as a prism sheet of a typical liquid crystal display. Thus the prism sheet can be omitted. The number of optical elements is reduced, resulting in a lower cost LCD device.

Figure 5:
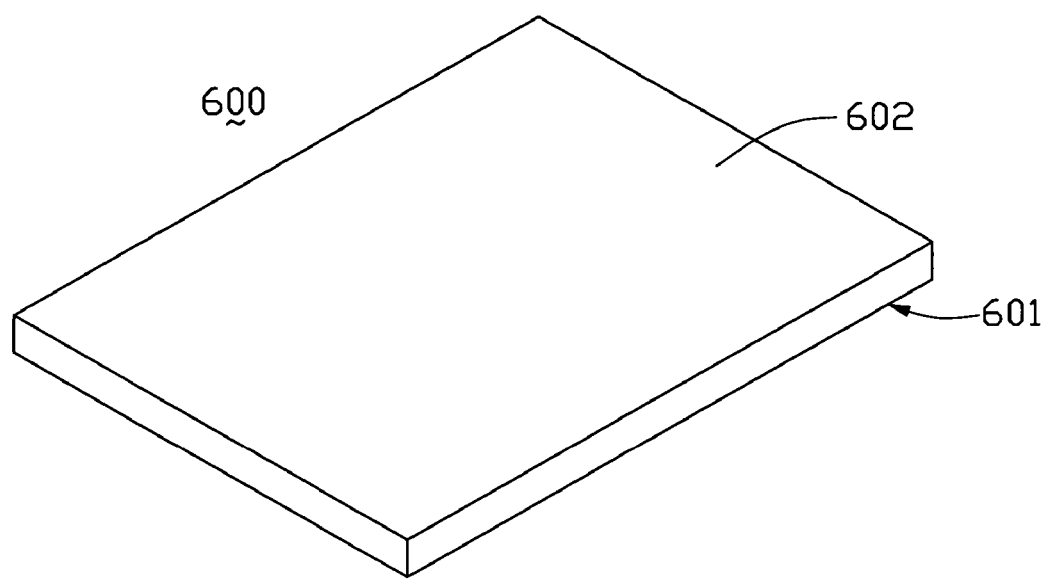
FIG. 5 is an isometric view of a workpiece used in a process for manufacturing a substrate of a liquid crystal display device, in accordance with another embodiment of the present invention.
Figure 6:
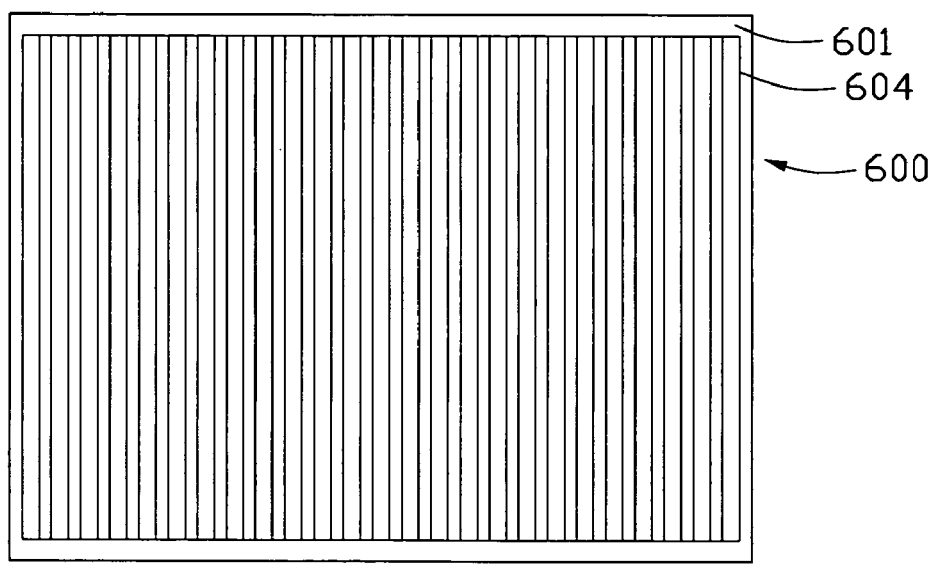
FIG. 6 is a bottom plan view of the workpiece of FIG. 5, showing anti-corrosion paper attached on the workpiece in one stage of the process for manufacturing a substrate.
Figure 7:
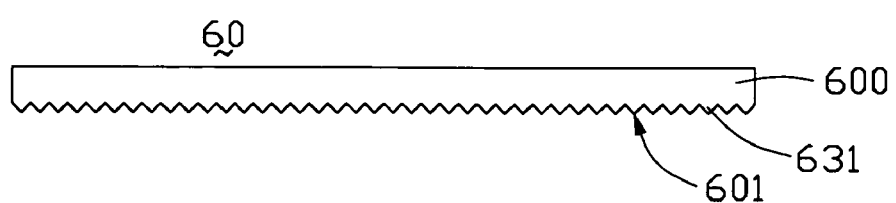
FIG. 7 is a side plan view of the workpiece of FIG. 6 after completion of the process for manufacturing a substrate, the finished workpiece constituting the substrate.
Figure 8:
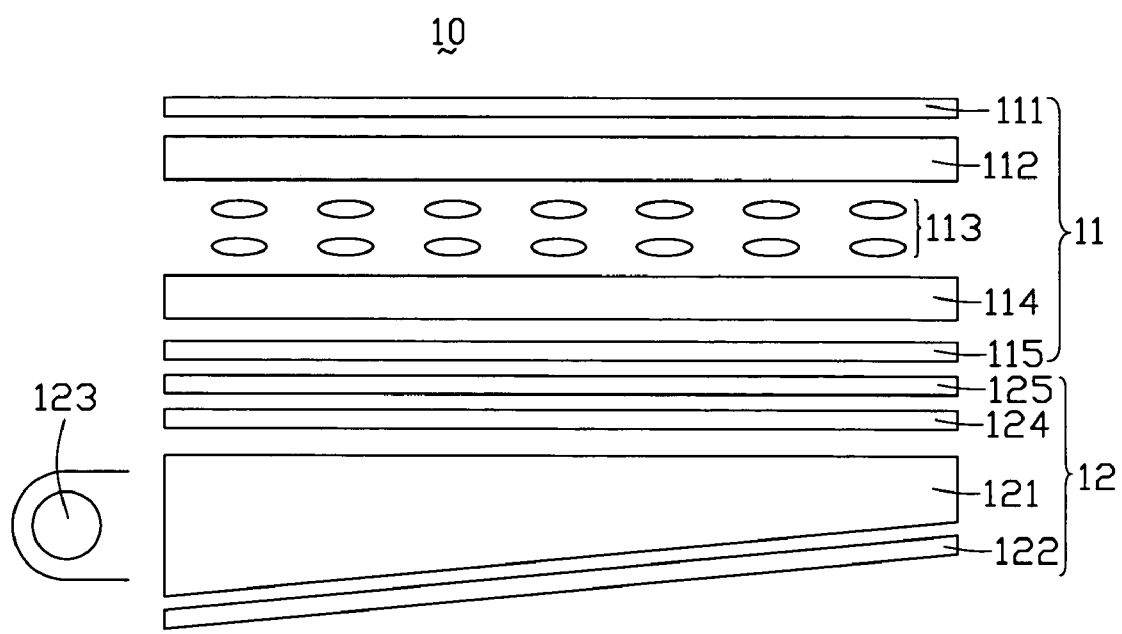
FIG. 8 is a schematic, exploded, side cross-sectional view of a conventional LCD device.

FIGS. 5-7 show successive stage of a process for manufacturing a substrate of a liquid crystal display device, in accordance with another embodiment of the present invention.

A workpiece 600 is provided, the workpiece 600 including opposite top and bottom surfaces 602, 601. Then anti-corrosion paper 604 is adhibited on the bottom surface 601. The anti-corrosion paper 604 has a pattern corresponding to a pattern of a desired prism structure to be made. Lastly, a process of etching is performed to form a prism structure 631 at the bottom surface 601. The prism structure 631 comprises a plurality of prisms, which define V-shaped grooves therebetween. Each of the prisms defines a bottom angle, which is in a range of 75° to 110°.

The anti-corrosion paper 604 may be anti-acidic or anti-alkaline, and the process of etching is an isotropic chemical etching process. Furthermore, the method may also include a process of forming a thin film transistor array on the top surface 602 of the workpiece 600.

It is to be understood, however, that even though numerous characteristics and advantages of the present embodiments have been set out in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
    a first substrate;
    a second substrate opposite to the first substrate, the second substrate comprising a prism structure at an outer surface thereof;
    a liquid crystal layer having liquid crystal molecules interposed between the first and second substrates; and
    a backlight module disposed adjacent to the prism structure.

2. The liquid crystal display device as claimed in claim 1, wherein the prism structure comprises a plurality of prisms which define V-shaped grooves therebetween.

3. The liquid crystal display device as claimed in claim 2, wherein each of the prisms defines a bottom angle, and the bottom angle is in a range of 75° to 110°.

4. The liquid crystal display device as claimed in claim 3, further comprising a thin film transistor array disposed on an inner surface of the second substrate.

5. The liquid crystal display device as claimed in claim 4, wherein the back light module includes a reflection sheet, a light guide plate, and a diffusion sheet positioned in that sequence.

6. The liquid crystal display device as claimed in claim 5, further comprising a first polarizer and a second polarizer respectively provided at outer sides of the first and second substrates.

7. The liquid crystal display device as claimed in claim 6, further comprising an upper retardation film disposed between the first polarizer and the first substrate, and a lower retardation film disposed between the second polarizer and the second substrate.

8. The liquid crystal display device as claimed in claim 1, wherein a bottom portion of each prism is curved.

9. A liquid crystal display device, comprising:
    a first substrate;
    a second substrate opposite to the first substrate;
    a liquid crystal layer having liquid crystal molecules interposed between the first and second substrates; and
    a light guide plate disposed by an outer side of said second substrate; wherein no discrete prism sheet is positioned between the said light guide plate and said second substrate;
    wherein said second substrate includes a prism structure thereof to replace said discrete prism sheet.

10. The liquid crystal display device as claimed in claim 9, wherein said prism structure is formed on an outer face of said second substrate.

* * * * *